(12) United States Patent
Pham et al.

(10) Patent No.: US 11,030,614 B2
(45) Date of Patent: *Jun. 8, 2021

(54) MODULAR TRANSACTION CARD

(71) Applicant: Capital One Services, LLC, McLean, VA (US)

(72) Inventors: Vincent Pham, Champaign, IL (US); Mark Watson, Sedona, AZ (US); Reza Farivar, Champaign, IL (US); Fardin Abdi Taghi Abad, Seattle, WA (US); Jeremy Goodsitt, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,227

(22) Filed: Feb. 14, 2020

(65) Prior Publication Data

US 2020/0372491 A1 Nov. 26, 2020

Related U.S. Application Data

(63) Continuation of application No. 16/422,306, filed on May 24, 2019, now Pat. No. 10,614,449.

(51) Int. Cl.
*G06K 5/00* (2006.01)
*G06Q 20/34* (2012.01)
*G06K 19/077* (2006.01)

(52) U.S. Cl.
CPC ..... *G06Q 20/355* (2013.01); *G06K 19/07703* (2013.01); *G06K 19/07732* (2013.01); *G06K 19/07737* (2013.01)

(58) Field of Classification Search
CPC . G06Q 20/355; G06Q 20/34; G06K 19/07737
(Continued)

(56) References Cited

U.S. PATENT DOCUMENTS

| 3,511,181 A | 5/1970 | McGiffen et al. |
| 5,326,964 A | 7/1994 | Risser |

(Continued)

FOREIGN PATENT DOCUMENTS

GB 2 451 576 2/2009

OTHER PUBLICATIONS

Bulacu, M. et al.; "Writer Identification Using Edge-Based Directional Features", IEEE Computer Society, Proceedings of the Seventh International Conference on Document Analysis and Recognition (ICDAR 2003).

*Primary Examiner* — Ahshik Kim

(74) *Attorney, Agent, or Firm* — Hunton Andrews Kurth LLP

(57) ABSTRACT

Embodiments of the present disclosure provide a device, system, methods and components related to a modular card. Example components of the modular card include a thin rectangular rear plate, a thin rectangular front plate overlying the rear plate, a first plurality of fasteners fixed to the thin rectangular front plate, a second plurality of fasteners fixed to the thin rectangular rear plate, the second plurality of fasteners being configured to be removably engaged with the first plurality of fasteners; a magnetic strip, and/or an integrated circuit. In operation a user may remove and/or replace various components to customize the modular card. Some customizations include altering the accounts to which the modular card relates. In some example, the modular card may include components which relate to different accounts.

20 Claims, 8 Drawing Sheets

(58) Field of Classification Search
USPC .......................................................... 235/380
See application file for complete search history.

(56) References Cited

U.S. PATENT DOCUMENTS

| | | |
|---|---|---|
| 6,196,594 B1 | 3/2001 | Keller |
| 6,964,377 B1 | 11/2005 | Haghiri et al. |
| 8,725,589 B1 | 5/2014 | Skelding et al. |
| 2006/0208062 A1 | 9/2006 | Osborn et al. |
| 2006/0262655 A1* | 11/2006 | Persson ................ A45C 11/182 369/1 |
| 2010/0176194 A1 | 6/2010 | Hodgkinson et al. |
| 2012/0193414 A1 | 8/2012 | Thibaudeau |
| 2014/0339315 A1 | 11/2014 | Ko |
| 2018/0165562 A1 | 6/2018 | Suthar |

\* cited by examiner

Method 800

MODULAR TRANSACTION CARD

CROSS REFERENCE TO RELATED APPLICATION

The subject application is a continuation of U.S. patent application Ser. No. 16/422,306 filed May 24, 2019, the contents of which are hereby incorporated by reference in their entirety.

FIELD OF THE INVENTION

This disclosure relates to a modular payment card with at least one component that can be removed or replaced.

BACKGROUND

Payment cards, such as credit cards and debit cards, are a rapidly growing industry and are used by a majority of modern households. While payment cards make transactions relatively quick and easy, changing the appearance or configuration of a payment card is a time-consuming process. As payment cards become increasingly associated with a user's cultural identity, users wish to edit the appearance of a card more often.

Previously, in order to change the appearance of a payment card, a user would have to order an entirely new payment card from the card issuing institution and cancel the existing card. In some cases, this resulted in a new payment card number being issued which would require the user to update any established payment accounts, such as online accounts, which relied upon the previous payment card number. Once a new card is ordered, the user may have to wait several days for the new card to arrive and may be without any working payment card during this period.

Traditionally, when a payment card is replaced, the entire card would be replaced. This required the replacement of components of the card which were still functional and potentially expensive.

Accordingly, there is a need for a payment card which allows the user to customize its appearance and/or configuration without requesting a new card or cancelling the existing card. Such a card may also create the ability to replace components of a card while continuing to use other components, thereby avoiding unnecessary waste and expense.

What is needed is a modular card with removable and/or replaceable components which allows the user to configure a card quickly and easily.

SUMMARY

Therefore, it is an object of this disclosure to describe a module payment card with components that are removable and/or replaceable.

It is another object of the invention to describe a payment card that can be customized by the user quickly and easily so that the user can alter the appearance of the card based on holidays, special events, or simple preference.

It is a further object of the invention to describe a payment card that can have functional components easily replaced so that the user can alter function of the card and the accounts linked to the card easily.

It is yet another object of the invention to describe a card that avoids unnecessary replacement expense by allowing the replacement of particular components while reusing other components.

Embodiments of the present disclosure relate to a modular payment card comprising a thin rectangular rear plate, a thin rectangular front plate overlying the thin rectangular rear plate, a first plurality of fasteners fixed to the thin rectangular front plate, a second plurality of fasteners fixed to the thin rectangular rear plate, and at least one of a magnetic strip and an integrated circuit fixed to the thin rectangular rear plate. The second plurality of fasteners on the rear plate may be configured to be removably engaged with the first plurality of fasteners on the front plate.

Embodiments of the present disclosure relate to a method of replacing a component of a modular payment card comprising the steps of separating a thin rectangular rear plate from a thin rectangular front plate overlying the thin rectangular rear plate such that a first plurality of fasteners fixed to the thin rectangular front plate disengage from a second plurality of fasteners fixed to the thin rectangular rear plate. Then, removing at least one of an integrated circuit or a magnetic strip from the thin rectangular rear plate and reattaching the thin rectangular rear plate to the thin rectangular front plate.

Further embodiments of the disclosed system relate to a modular payment card comprising a thin rectangular plate, a first slot formed in the thin rectangular plate configured to receive an integrated circuit, a second slot formed in the thin rectangular plate configured to receive a magnetic strip, and a plurality of fasteners fixed to the thin rectangular plate and configured to removably attach the thin rectangular plate to an object.

Further features of the disclosed designs, and the advantages offered thereby, are explained in greater detail hereinafter with reference to specific example embodiments illustrated in the accompanying drawings.

DETAILED DESCRIPTION OF EXEMPLARY EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention. It will be appreciated that the figures may not reflect an accurate sense of scale. The figures are intended to be illustrative and to inform the reader regarding potential relationships between various components. A person of ordinary skill in the art reviewing the figures should be able to learn and understand the different described aspects of the illustrated embodiments.

A modular card is described herein. It will be appreciated that while example embodiments are generally described in terms of credit cards, the disclosed cards, components, methods, and techniques may be applied to debit cards, payment cards, access cards, security cards, smart cards, identification cards, loyalty cards, and the like.

An example embodiment of a disclosed modular credit card comprises a rectangular rear plate, with an interior face and an exterior face, and a rectangular front plate, with an interior face and an exterior face. A first set of fasteners is fixed to the interior face of the front plate. A second set of fasteners is fixed to the interior face of the rear plate. In some embodiments a magnetic strip is fixed to the exterior face of the rear plate and/or an integrated circuit is fixed to the interior face of the rear plate. In some embodiments, the front plate comprises a cut out located to allow access to the integrated circuit fixed to the interior face of the rear plate. In some embodiments, the cut out may be substantially the same size and/or dimensions as the integrated circuit. In some embodiments, the cut out in the front plate may be smaller than the integrated circuit, thereby allowing the front plate to retain the integrated circuit within the modular card when the front plate is engaged with the rear plate.

Figure 1A:
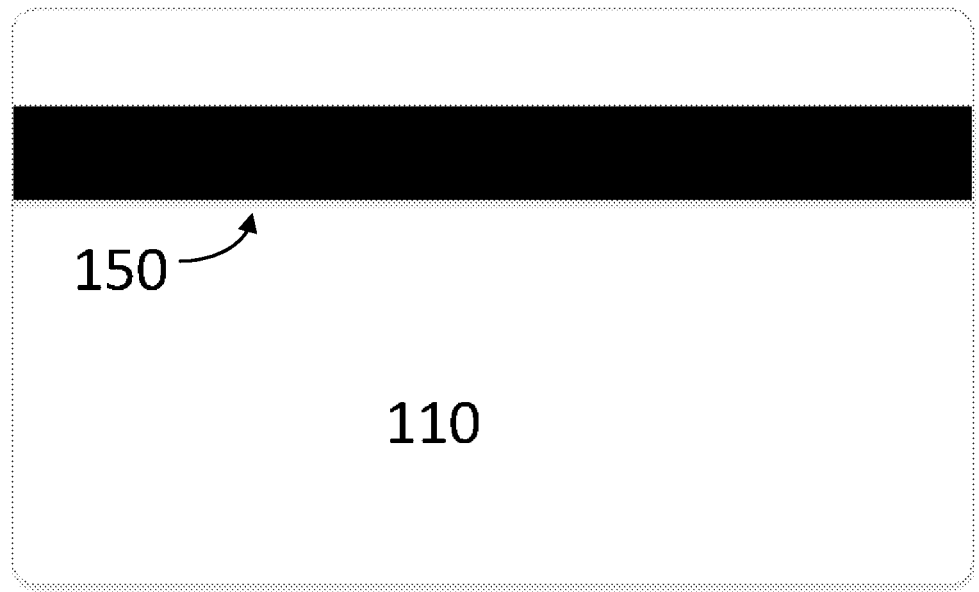
FIGS. 1A and 1B illustrate an example embodiment of a rear plate.

FIG. 1A illustrates an example embodiment of the exterior face of the rear plate 110. A magnetic strip 150 is fixed to the exterior face of the rear plate 110. It will be appreciated that other information may also be included on the exterior face of the rear plate including, but not limited to, user name, signature block, account number, expiration date, record keeping numbers, contact information and/or information related to the card issuer.

Figure 1B:
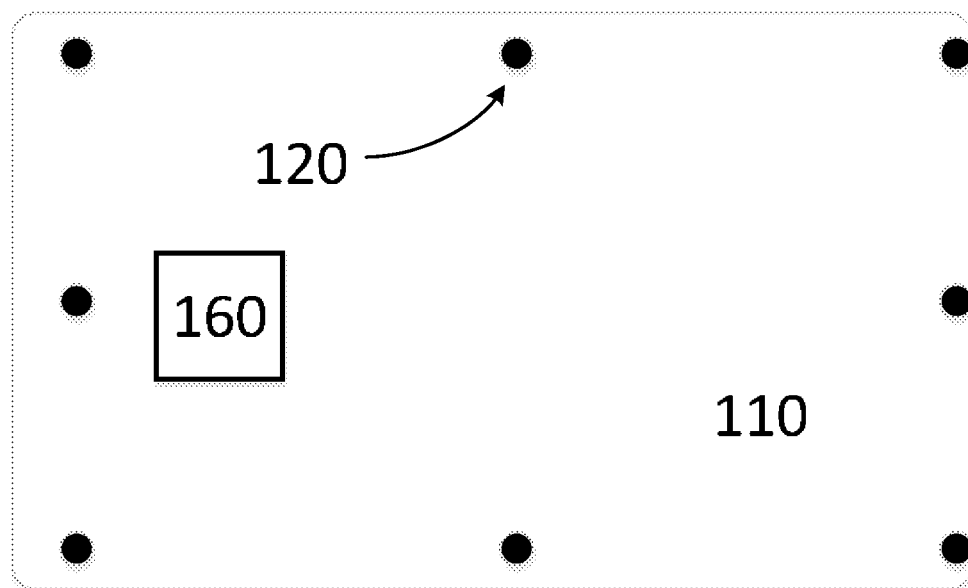

FIG. 1B illustrates an example embodiment of the interior face of the rear plate 110. A set of fasteners 120 and an integrated circuit 160 is fixed to the interior face of the rear plate.

Figure 2A:
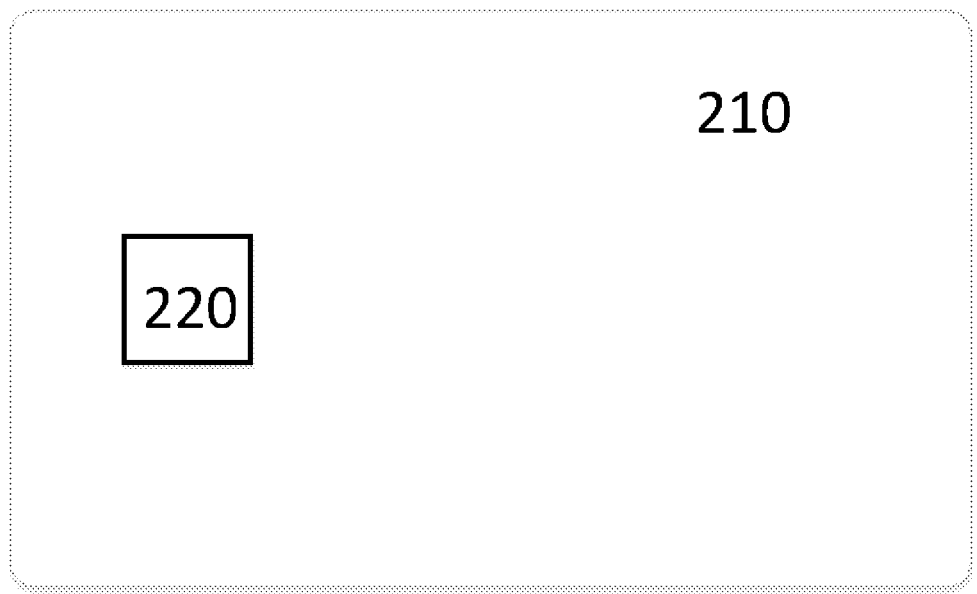
FIGS. 2A and 2B illustrate an example embodiment of a front plate.

FIG. 2A illustrates an example embodiment of the exterior face of the front plate 210. The exterior of the front plate is the portion of a card most commonly decorated and/or customized to achieve a particular appearance and/or aesthetic. Front plate 210 may have a cut-out 220 arranged to allow access to an integrated circuit fixed to the interior face of the rear plate when the front and rear plates of a card are assembled.

Figure 2B:
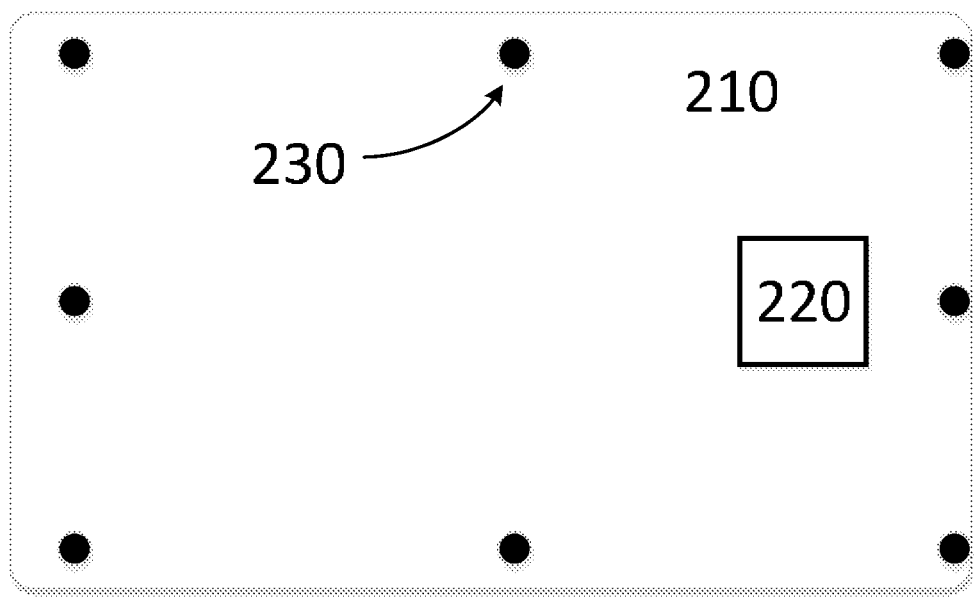

FIG. 2B illustrates an example embodiment of the interior face of the front plate 210. The interior face of the front plate includes a set of fasteners 230 arranged to releaseably engage with a complementary set of fasteners on the interior face of the rear plate.

Unlike traditional credit cards, the components of the disclosed modular credit card may be replaced, changed, updated, and/or swapped with other similar components. For example, the front plate of the module card may be replaced with a second front plate which has a different design on the exterior face. A user may install a seasonal theme front plate onto the module card in the summer and replace the front plate with a thanks-giving themed front plate in the fall. Similarly, a user may install a front plate with a celebratory design on the user's birthday. A user may install a plain and/or professional front plate while attending a work event and then switch to a sports themed front plate later in the same evening.

In addition to customizing the appearance of the modular card by switching the front plates, the user may swap between multiple integrated circuits and/or magnetic strips as well. A modular integrated circuit may be configured to endure multiple and/or frequent replacement and the associated handling of the integrated circuit. In some embodiments, the integrated circuit may be attached to a supportive substrate and/or backing in order to improve the durability and/or rigidity of the integrated circuit. Similarly, in some embodiments, a modular magnetic strip may comprise a thin magnetic film and/or may comprise a substrate in order to improve the durability of the modular magnetic strip. In some embodiments, the module magnetic strip and/or module integrated circuit may further comprise a slot, snap, or other fastening mechanism in order to retain the modular magnetic strip and/or integrated circuit in the assembled module credit card.

In some embodiments, when the rear plate and front plate are assembled together, the assembled modular credit card resembles and is substantially indistinguishable from a traditional credit card. The fasteners on the interior of the front and rear plates engage to maintain the credit card in an assembled state, allowing the user to swipe the magnetic strip on the rear of the card, dip the card into a card reader to utilize the integrated circuit for a contact based transaction, and/or tap the card near a card reader to utilize a the integrated circuit for a contactless transaction.

Embodiments of the modular card or modular components may comprise a substrate or multiple substrates for each modular component. Substrates may include, but are not limited to, a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the modular card or modular components may have physical characteristics compliant with the ID-1 format of the ISO/IEC 7810 standard, and the card may otherwise be compliant with the ISO/IEC 14443 standard. However, it is understood that the modular card and/or modular components according to the present disclosure may have different characteristics, and the present disclosure does not require a modular card to be implemented in a payment card. Additionally, in some payment card embodiments, the modular card may not comply with industry standards. In some embodiments, the modular card may be thicker, taller, longer, or otherwise different than directed by industry standards. Such embodiments may be prevented from being inserted into a standard-compliant card reader. In some embodiments, this allows for increased security depending on the user's anticipated use of the card.

In some embodiments, the integrated circuit may be a contactless communication circuit. In some embodiments, the integrated circuit may include an antennae, transmitter, receiver, power harvesting circuit, and/or communications circuit. In some embodiments, the integrated circuit may be configured to communicate wirelessly including, for example, communicating using the EMV protocol, BluTooth, NFC, and/or Wi-Fi signals.

In some embodiments, the integrated circuit may include a memory or the modular card may include an separate memory. In some embodiments, the memory may be a read-only memory, write-once read-multiple memory or read/write memory, e.g., ROM and EEPROM, and the contactless card may include one or more of these memories or combinations of these memories. A read-only memory may be factory programmable as read-only or one-time programmable. One-time programmability provides the opportunity to write once then read many times. A write once/read-multiple memory may be programmed at a point in time after the memory chip has left the factory. Once the write once memory is programmed, it may not be rewritten, but it may be read many times. A read/write memory may be programmed and re-programmed many times after leaving the factory. It may also be read many times.

A traditional credit card is about 30 mils (1/1,000th of an inch) thick. In order for some embodiments of the disclosed modular credit card to operate with traditional card readers, the total thickness of the assembled module card is about the same thickness. It will be appreciated that in some embodiments, the front plate and rear plate have a combined thickness of about 30 mils, but the front plate and rear plate are not required to be the same thickness.

In some embodiments, the thickness of the rear plate is less than about 25 mils, or less than about 20 mils, or less than about 15 mils, or less than about 10 mils. In some embodiments, the thickness of the rear plate is greater than about 20 mils, or less greater about 15 mils, or greater than about 10 mils or greater than about 5 mils.

In some embodiments, the thickness of the front plate is less than about 20 mils, or less than about 15 mils, or less than about 10 mils, or less than about 5 mils. In some embodiments, the thickness of the front plate is greater than about 15 mils, or greater than about 10 mils, or greater than about 5 mils, or greater than about 3 mils.

In some embodiments, the primary purpose of the front plate is aesthetic and the rear plate supports all or the majority of the functional components such as, for example, a magnetic strip and/or integrated circuit. In some embodiments, the rear plate may be thicker, more durable, and/or more rigid relative to the front plate. In some embodiments, it is anticipated that the user may replace the front plate more frequently than the rear plate, thereby reducing the need for the front plate withstand the stresses of regular use for an extended period of time.

In some embodiments, the interior face of the rear plate includes an indentation configured to receive the integrated circuit. In such embodiments, the indentation may be as deep as the integrated circuit is thick. In this configuration one face of the integrated circuit is flush with the interior face of the rear plate while the other face of the integrated circuit is embedded within the rear plate. In such embodiments, the rear plate will be at least somewhat thicker than the integrated circuit.

In some embodiments, an indentation in the rear plate configured to receive the integrated circuit may be designed to allow the integrated circuit to extend beyond the interior face of the rear plate. In some embodiments, the indention may be designed so that the integrated circuit extends beyond the interior face of the rear plate by an amount substantially equal to the thickness of the front plate. In such embodiments, the integrated circuit may extend through a cut-out in the front plate and be substantially flush with the exterior face of the front plate.

Figure 3A:
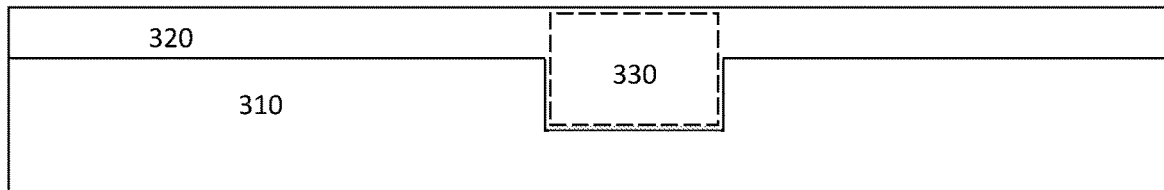
FIGS. 3A and 3B illustrate an example embodiment of a modular card with an example modular integrated circuit.

FIG. 3A illustrates a side view of an example embodiment of the disclosed modular credit card. In some embodiments, rear plate 310 is thicker than front plate 320. Integrated circuit 330 is recessed into an indention in the rear plate 310, extends beyond the interior face of the rear plate 310 and through a cut out (not shown) in the front plate 320 so that the integrated is flush or substantially flush with the exterior face of the front plate 320. In some embodiments, the rear plate may not include an indention for receiving the integrated circuit. In such embodiments, the front plate may include a cut out configured to receive the integrated circuit. The integrated circuit may be maintained in the desired position by the cut out in the front plate and the attachment of the front plate to the rear plate.

In some embodiments, the exterior face of the rear plate includes an indentation configured to receive a modular magnetic strip. The indentation may be configured to be substantially the same depth as the modular magnetic strip is thick to position the surface of the magnetic strip substantially flush with the exterior face of the rear plate.

Figure 3B:
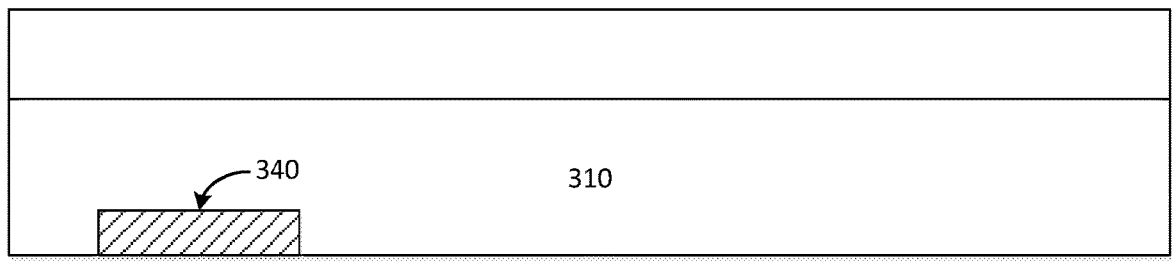

FIG. 3B illustrates a side view of an example embodiment of the disclosed module credit card. In some embodiments, the rear plate 310 comprises an indention for the modular magnetic strip 340.

Figure 4A:
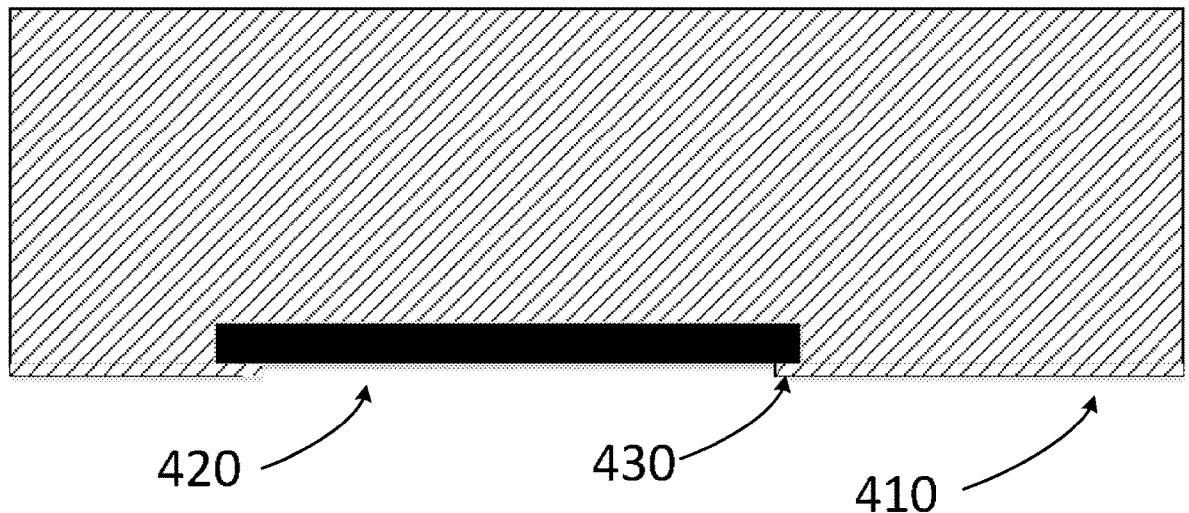
FIGS. 4A and 4B illustrate an example embodiment of a modular card with an example modular magnetic strip.

In some embodiments, the modular magnetic strip is slidably inserted into a groove or recession in the rear plate. FIG. 4A illustrates a zoom in view of rear plate 410 configured with a retaining groove to slide a module magnetic strip 420 into the rear plate 410. As seen in the embodiment of FIG. 4A, retaining groove includes projections 430 which cause the opening of the retaining groove to be at least somewhat narrower than the modular magnetic strip. Accordingly, the modular magnetic strip 420 may slide into the retaining groove and be retained in position by the projections 430.

In some embodiments, the retaining projections cause the magnetic strip to be at least somewhat recessed from the exterior face of the rear plate. In some embodiments, the modular magnetic strip is formed mating projections of its own which allow the surface of the modular magnetic strip to be flush with the exterior surface of the rear plate while the modular magnetic strip is installed in the rear plate.

Figure 4B:
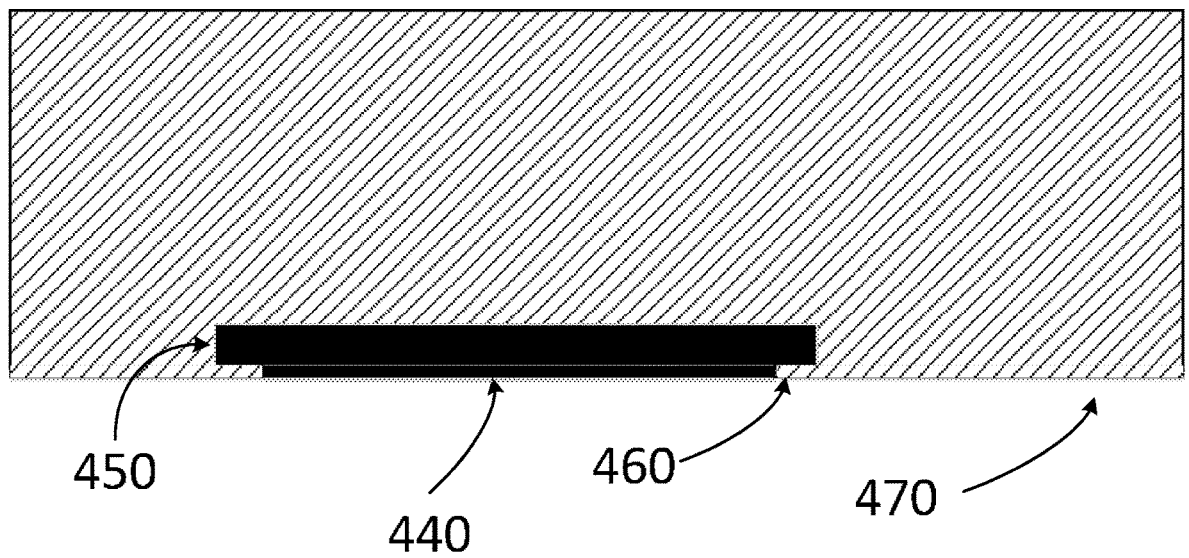

FIG. 4B illustrates an example embodiment in which the modular magnetic strip 440 is configured to have retaining projections 450. The retaining projections of the modular magnetic strip 450 are arranged to mate with the rear plate projections 460 so that the surface of the modular magnetic strip 440 may be substantially flush with the exterior surface of the rear plate 470. In such embodiments, the modular magnetic strip may be slide into the retaining groove of the rear plate.

In some embodiments, the rear plate comprises a cut-out which allows the modular magnetic strip to be retained within the rear plate while exposing the surface of the modular magnetic strip to be used for making transactions and/or conveying information. In some embodiments, the modular magnetic strip includes retaining projections as described with respect to FIG. 4B. Unlike the embodiment of FIG. 4B, in embodiments comprising a cut-out in the rear plate for a modular magnetic strip, the cut-out does not extend to the edges of the rear plate. The cut out in the rear plate may be configured to be slightly less wide than the modular magnetic strip or the retaining projections of the modular magnetic strip. In some embodiments, the modular magnetic strip comprises retaining projections on both the lengthwise edge and the widthwise edge. In such embodiments, the modular magnetic strip comprises a retaining projection around all or substantially all of the magnetic strip. The retaining projections may be configured to allow the modular magnetic strip to be inserted into the cut-out of the rear plate and then held in position when the front plate is attached to the rear plate.

Figure 5A:
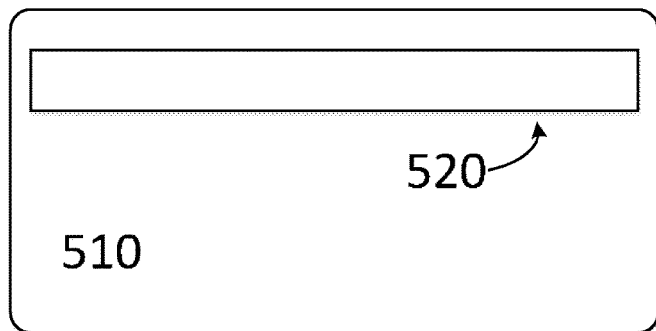
FIGS. 5A, 5B, and 5C illustrate an example embodiment of a modular card with an example modular magnetic strip.
Figure 5B:
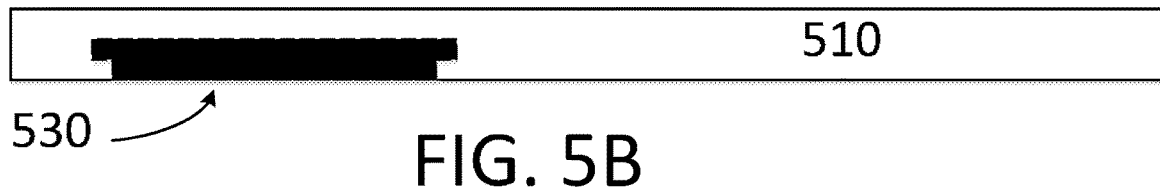
Figure 5C:
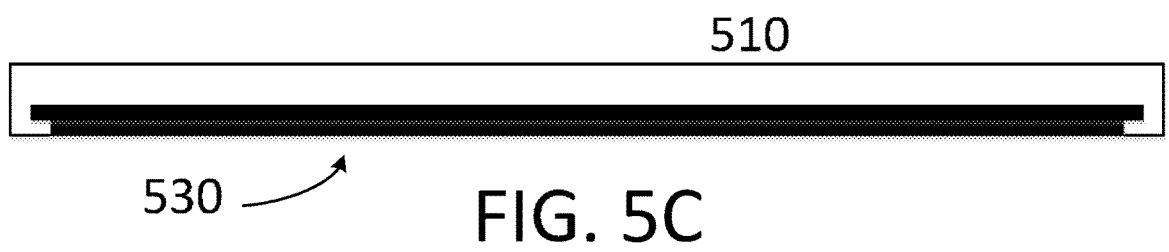

FIG. 5A illustrates an example embodiment of rear plate 510 with cut out 520. FIG. 5B illustrates a side view of the shorter, width, side of rear plate 510 with a modular magnetic strip 530 inserted into the cut-out. FIG. 5C illustrates a side view of the longer side of rear plate 510 with a modular magnetic strip 530 inserted into the cut out.

In some embodiments, the front plate includes a micro-ridge on the interior face of the front plate and/or the rear plate includes a micro-ridge on the interior face of the rear plate. In some embodiments, a micro-ridge on the interior face of the front plate engages with a micro-ridge on the interior face of the rear plate to prevent the front plate and rear plate form moving relative to each other in at least one direction.

In some embodiments, the front plate and rear plate include at least two micro-ridges on their respective interior faces. In such embodiments, the additional micro-ridge of the front and rear plates engage to prevent the front plate and rear plate from moving relative to each other in an additional, second direction.

Figure 6A:
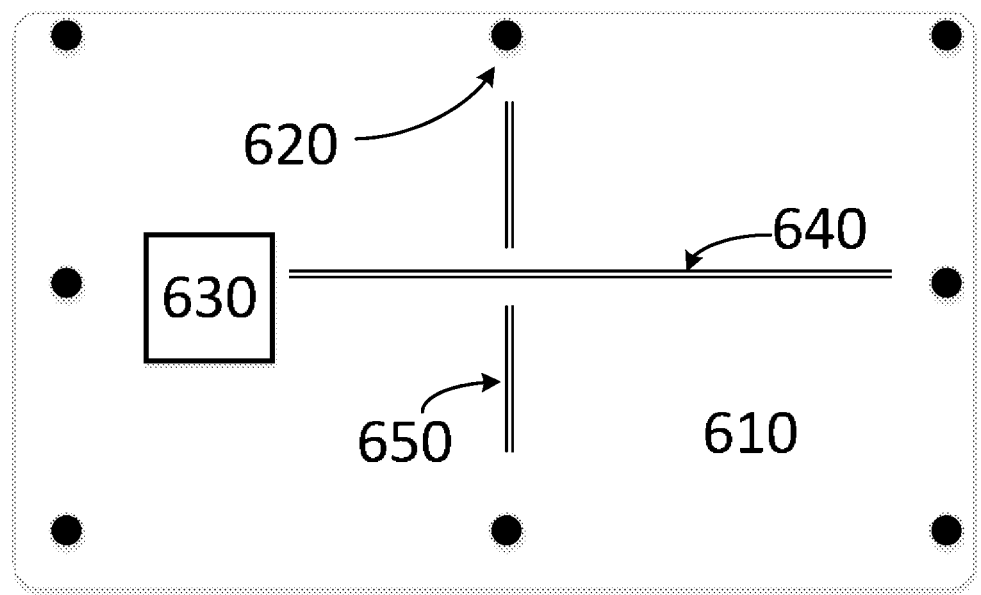
FIGS. 6A and 6B illustrate an example embodiment of a modular card with fasteners.

FIG. 6A illustrates an example embodiment of the interior face of a rear plate 610 with fasteners 620, an integrated circuit 630, a first micro-ridge 640 and a second micro-ridge 650. In some embodiments, the first and second micro-ridge may cross where they intersect. In some embodiments, such as the embodiment of FIG. 6A, the first and/or second micro-ridge may be in two or more portions on either side of the other micro-ridge. While fasteners are included in the exemplary embodiment of FIG. 6A, not every embodiment of the disclosed modular card will include fasteners. In some embodiments, a front plate and rear plate may be assembled using retaining grooves, micro-ridges, magnets, snapping engagement, and/or adhesive materials.

Figure 6B:
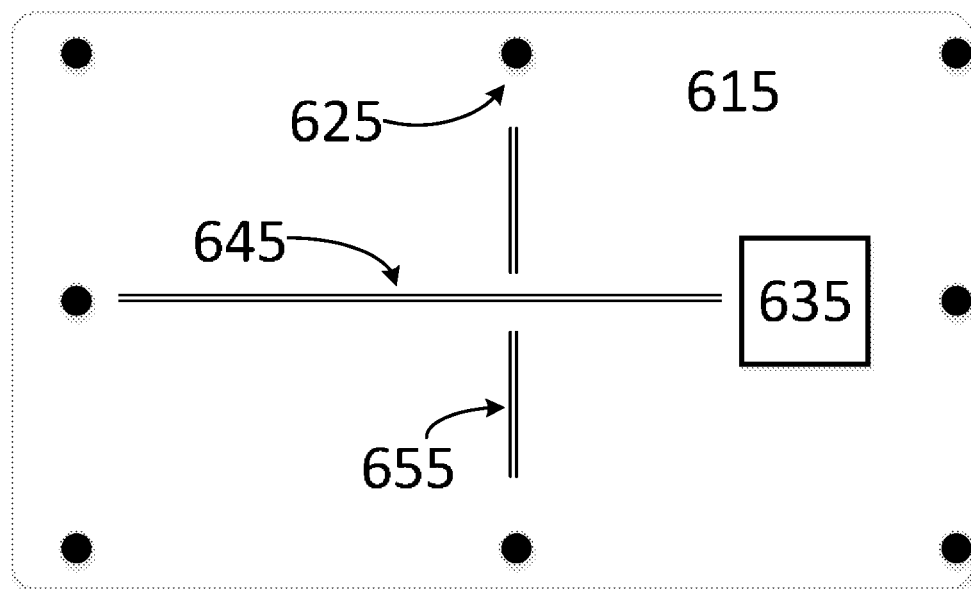

FIG. 6B illustrates an example embodiment of the interior of a front plate with fasteners, a cut-out for an integrated circuit, a first micro-ridge 640 and a second micro-ridge 650. In some embodiments, the micro ridges on the interior faces of the front and rear plates limit the movement of the front and rear plate relative to each other. This may serve to support and/or reinforce the engagement of the fasteners of the front plate to the fasteners of the rear plate.

In some embodiments, micro-ridges and/or fasteners may be used in combination with a retaining groove in order assemble the front and rear plates of the disclosed modular card. In some embodiments, the rear plate and/or the front plate may have a retaining groove, configured to receive to other plate. In some embodiments, the receiving groove may be located on two opposing edges of a plate, for example, on both length wise edges of the rear plate. In some embodiments, three sides of the front and/or rear plate may include a retaining groove so that the opposing plate may be slid into the retaining groove.

Figure 7A:
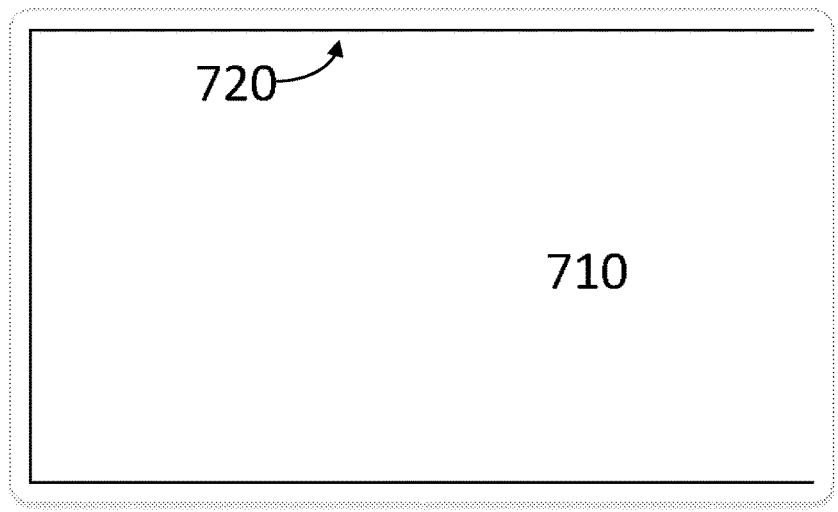
FIGS. 7A and 7B illustrate an example embodiment of a modular card with a retaining groove.
Figure 7B:
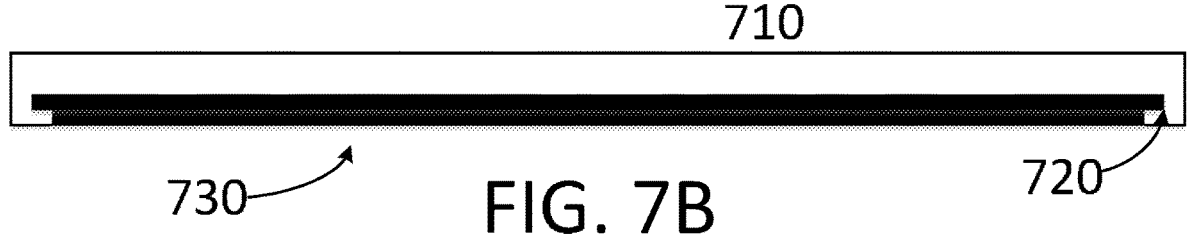

FIG. 7A illustrates an example embodiment of a rear plate 710 with a retaining groove 720 on three sides. FIG. 7B illustrates a side view from the side of the rear plate 710 which does not include a retaining groove 720. FIG. 7B illustrates a front plate 730 inserted into the retaining groove 720 such that the front plate 730 may only be move relative to the rear plate 710 one direction. In some embodiments, the retaining groove may be considered a cut out. In such embodiments, the cut out or retaining groove, may be configured to restrain movement of the front plate in a plane substantially parallel to the rear plate.

It will be appreciated that any combination of retaining grooves, fasteners, micro-ridges, and other methods of attaching the front and rear plates may be utilized. The disclosed fasteners may include any fastener suitable for attaching the front plate to the rear plate. In some embodiments, the plurality of fasteners on the front plate are configured to engage with the plurality of fasteners on the rear plate by snap fit. In such embodiments, either the front plate or back plate may comprise entirely male snap components or entirely female snap components. In some embodiments, fasteners may alternate male and female snap components or use any other pattern, including, for example, random placement, of interlocking snap components. In some embodiments, the fasteners of the front and/or rear plate may be made of non-deformable material.

In some embodiments, the fasteners of the rear plate extend outward from the rear plate toward the front plate and the fasteners of the front plate are configured to receive the fasteners of the rear plate. In some embodiments, the fasteners of the front plate extend outward from the front plate toward the rear plate and the fasteners of the rear plate are configured to receive the fasteners of the front plate.

In some embodiments, the plurality of fasteners on the front plate are configured to engage with the plurality of fasteners on the rear plate magnetically. In some embodiments the front and/or rear plate may comprise magnetic fasteners while the other plate comprises fasteners comprising a material that is attracted to magnetic fasteners. In some embodiments the front plate or rear plate may comprise magnetic fasteners while the other plate comprises a material that is attracted to magnetic fasteners and does not include distinct fasteners. In an example embodiment, a rear plate may include magnetic fasteners and the front plate may be made of or comprise a thin rectangular sheet of metal.

In some embodiments, each of the plurality of fasteners on the front plate is located near a corner of the thin rectangular front plate, and each of the plurality of fasteners on the rear plate is located near a corner of the thin rectangular rear plate.

In some embodiments, the disclosed modular card comprises a magnetic strip and magnetic fasteners. In order to avoid interfering with the operation, data storage, and/or data transmission of the magnetic, the magnetic fasteners may be offset from the magnetic strip in a direction parallel to a plane of the thin rectangular rear plate. For example, in some embodiments, the magnetic fasteners are not positioned directly opposite, behind, and/or under the magnetic strip.

Figure 8:
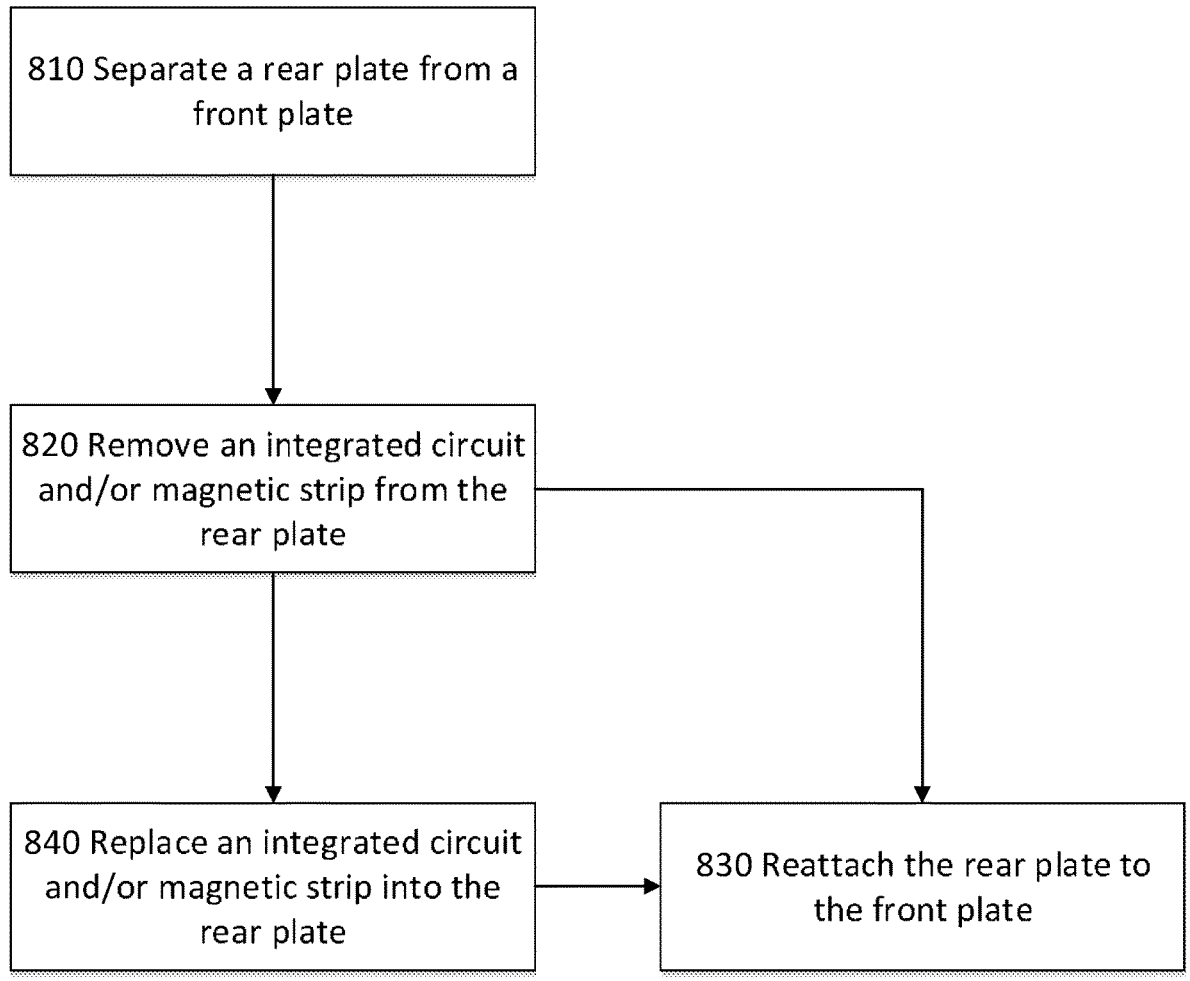
FIG. 8 illustrates a flow chart of an exemplary method of utilizing the modular card.

FIG. 8 is a flow chart illustrating a method of replacing a component of a modular payment card. Method 800 may reference the same or similar components as illustrated in FIG. 1A, FIG. 1B, FIG. 2A, FIG. 2B, FIG. 3A, FIG. 3B, FIG. 4A, FIG. 4B, FIG. 5A, FIG. 5B, FIG. 5C, FIG. 6A, FIG. 6B, FIG. 7A and/or FIG. 7B.

Method 800 may commence in step 810 with separating a thin rectangular rear plate from a thin rectangular front plate overlying the thin rectangular rear plate such that a first plurality of fasteners fixed to the thin rectangular front plate disengage from a second plurality of fasteners fixed to the thin rectangular rear plate. In some embodiments, the rear plate may be separated from the front plate by lifting one end of the front plate away from the rear plate, by sliding the front plate relative to the rear plate, and/or by twisting the front plate relative to the rear plate. Step 820 comprises removing at least one of an integrated circuit or a magnetic strip from the thin rectangular rear plate. In some embodiments, the integrated circuit and/or magnetic strip may be removably attached to the rear plate. In some embodiments, the integrated circuit and/or magnetic strip are not attached to the rear plate or the front plate, but may be held in place by engagement of the front plate and/or rear plate when the two plates are attached to each other. Once the integrated circuit and/or magnetic strip have been removed, step 830 comprises reattaching the thin rectangular rear plate to the thin rectangular front plate. Once this step is completed, the resulting modular card will be without In some embodiments, in step 840, prior to reattaching the thin rectangular rear plate to the thin rectangular front plate, a replacement integrated circuit and/or replacement magnetic strip may be inserted into the thin rectangular rear plate. By inserted a replacement integrated circuit and/or magnetic strip, the modular credit card can function as an entirely separate credit card. The information used to execute a transaction is typically stored on either or both of the integrated circuit and magnetic strip. Accordingly, replacing either or both the integrated circuit and/or magnetic strip may allow the card to be used to make purchase or other transactions using a different bank account or credit account.

In some embodiments, method 800 may be executed by removing the integrated circuit and reattaching the thin rectangular rear plate to the thin rectangular front plate such that the payment card is separated from the integrated circuit. Similarly, in some embodiments, method 800 may be executed by removing the magnetic strip and reattaching the thin rectangular rear plate to the thin rectangular front plate such that the payment card is separated from the magnetic strip. In addition to replacing the integrated circuit and/or magnetic strip, in some embodiments, either or both of these components may be removed from the modular card entirely. When the integrated circuit is removed, the card will be unable to execute transactions which require the use of the integrated circuit. Similarly, if the magnetic strip is removed, the card will be unable to execute transactions which require the use of the magnetic strip. These techniques may be used in order to control spending, and to limit potential exposure to security threats which may exploit the user of the integrated circuit and/or magnetic strip.

In some embodiments, either the integrated circuit or the magnetic strip may be removed from the modular card and replaced with a replacement component before reassembling the modular card. In some cases, the original integrated circuit or magnetic strip is left in the reassembled card. In such embodiments, the reassembled card may contain a magnetic strip that contains information related to a particular account and an integrated circuit which contains information related to a different account. In this configuration, the modular card may be used to replace two separate cards. In one non-limiting example, a user may configured the modular card to contain a magnetic strip that contains information related to his personal credit card account and an integrated circuit that contains information related to his business credit card account. The user may then use the same physical card to make transactions from each of her personal credit account and his business credit account based on the method of using the modular card.

In some embodiments, the module card may be designed to store replacement integrated circuits and/or magnetic strips within the modular card itself. For example, in some embodiments, the user may remove the front plate form the modular card, remove a first integrated circuit that the user has been using to make transactions, and remove a second integrated circuit from a storage within the modular card. The second integrated circuit may be installed in the operational position and the first integrated circuit may be placed in the storage. It will be appreciated that in some embodiments, the total thickness of the modular card may be limited by regulation, custom, and/or the need to function with existing card readers. Accordingly, in some embodiments, the components of the modular card are thin enough to allow a front plate, rear plate, magnetic strip, and integrated circuit to be cumulatively within a desired thickness range.

In some embodiments, the modular card includes a front plate which may be removed, changed, and/or replaced, by the user. In some embodiments, the front plate includes a graphic image on the exterior face opposite the rear plate. This image may be customized by the user or selected from an assortment of existing front plates. The replaceable front plate allows a user to customize the appearance of the modular card without requesting an entirely new card from the issuing organization. In some embodiments, a single front plate may have two difference graphic images on opposing faces. For example, a front plate may have an image of the user and her family on one face, and an image of the user's pets on the other side. In such an example embodiment, the user may be able to remove the front plate showing her family from her modular card, flip the front plate over and reinstall the front plate so that the images of her pets is now the exterior face of the card.

In some embodiments, the rear plate may include a graphic image on the exterior and/or interior face as well. In some embodiments, the rear plate may be reversible so that the user may change which image is displayed on the exterior or the card.

In some embodiments, the modular payment card comprises a thin rectangular plate with a slot formed in the plate. The slot may be configured to receive an integrated circuit. In some embodiments, the plate may also contain a second slot that is configured to receive a magnetic strip. The modular payment card may also comprise a plurality of fasteners that are fixed to the plate and configured to removably attach the plate to an object. In some embodiments, the object the plate is fixed to may be a thin rectangular plate but it may be substantially any object.

In some embodiments, the disclosed integrated circuit may include at least one antennae for contactless communication with a card reader. In such embodiments, the disclosed modular card is less likely to be physically inserted into a traditional card reader and therefore, may not need to be limited to a particular size, shape, or thickness. In embodiments of the modular card which are not designed to be inserted into a traditional card reader, the function of a magnetic strip may be limited. Accordingly, some embodiments of the modular card do not include a magnetic strip.

In some embodiments, the disclosed modular card may be configured as a pendant that may be worn on a lanyard, neckless, or bracelet. In such an embodiments, the modular card may include a front plate, rear plate, and integrated circuit configured for contactless communication. The user may use the tap or gesture with the pendant and associated integrated circuit near a contactless card reader in order to execute a transaction.

In some embodiments, the modular card may not be used as a payment card but may be utilized as an access card, security card, smart card, identification card, and/or loyalty card. In such embodiments, the modular magnetic strip and/or integrated circuit may be configured to contain and/or communicate information which grants access to a location, confirms an identity, and/or relates to a non-payment account.

In some embodiments the modular card may be configured to be utilized as any combination of the above cards including, for example, a payment card. In one non-limiting example, a user may configure her card to include a modular magnetic strip associated with her credit card account, thereby allowing the user to use the card to execute credit card transactions by swiping the card. The user may also configure the same modular card to include an integrated circuit that grants access and/or confirms her identity such as, for example, a gym membership. Using this single card, the user may purchase items using the magnetic strip which relates to her credit card account, and also check-in at her gym using the integrated circuit. It will be appreciated that a wide variety of potential combinations may be utilized.

In some embodiments, a user may elect to display a bar-code as a graphic image on the front and/or rear plate. In such embodiments, for example, the user may be able to execute purchases using a modular integrated circuit linked to a credit card account and access a secure area, such as an office building, using a modular magnetic strip which contains information related to the user's identity and security clearance. Using the same card, the user may also be able to check out books from a library by scanning a barcode displayed on the front plate and accrue loyalty points at a local retailer by scanning a separate barcode displayed on the rear plate.

In some embodiments, components of the card may be replaced by the provider of the card. For example, if fraudulent activity is associated with a user's account, the card provider may restrict access to that account. This action would traditionally, require the card provider to create and ship an entirely new card to the user before allowing the user to utilize the account again. Using a modular card, the provider is able to create and ship a limited number of new components, such as, for example, an integrated circuit and/or magnetic strip. This allows the provider to avoid the expense of producing an entirely new card with all of the required components. Multiple components may continue to be used with a replacement integrated circuit or magnetic strip, such as, for example, an antenna, front plate, rear plate, and/or battery. By increasing the operating life of multiple card components, the card provider may save significant expenses associated with card replacement.

While example embodiments describe, e.g., payment cards, such as credit cards, the present disclosure is not limited thereto. It is understood that the present disclosure encompasses cards used for any purposes, including without limitation payment cards, transaction cards, identity cards, security cards, loyalty cards, membership cards, and the like.

The present disclosure is not to be limited in terms of the particular embodiments described in this application, which are intended as illustrations of various aspects. Many modifications and variations can be made without departing from its spirit and scope, as may be apparent. Functionally equivalent methods and systems within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A modular payment card comprising:
   a rectangular rear plate;
   a rectangular front plate overlying the rectangular rear plate;
   a first plurality of fasteners fixed to the rectangular front plate;
   a second plurality of fasteners fixed to the rectangular rear plate, the second plurality of fasteners being configured to be magnetically engaged with the first plurality of fasteners; and
   a magnetic strip and an integrated circuit fixed to the rectangular rear plate.

2. The modular payment card of claim 1, wherein:
   the rectangular rear plate includes an indentation configured to receive the integrated circuit, and
   the magnetic strip is fixed to the rectangular rear plate.

3. The modular payment card of claim 1, wherein:
   the rectangular rear plate includes an indentation configured to receive the magnetic strip, and
   the integrated circuit is fixed to the rectangular rear plate.

4. The modular payment card of claim 3, wherein:
   the rectangular front plate includes a first micro-ridge on a face adjacent to the rectangular rear plate,
   the rectangular rear plate includes a second micro-ridge on a second face adjacent to the rectangular front plate, and
   the first micro-ridge and the second micro-ridge engage to prevent the rectangular front plate and the rectangular rear plate from moving relatively in at least a first direction.

5. The modular payment card of claim 4, wherein:
   the rectangular front plate includes a third micro-ridge on a face adjacent to the rectangular rear plate,
   the rectangular rear plate includes a fourth micro-ridge on a second face adjacent to the rectangular front plate, and
   the third micro-ridge and the fourth micro-ridge engage to prevent the rectangular front plate and the rectangular rear plate from moving relatively in at least a second direction.

6. The modular payment card of claim 1, wherein:
   the first plurality of fasteners are configured to engage with the second plurality of fasteners by snap fit.

7. The modular payment card of claim 1, wherein the rectangular front plate includes a cutout configured to receive the integrated circuit.

8. The modular payment card of claim 6, wherein the cutout is configured to restrain movement of the rectangular front plate in a plane parallel to the rectangular rear plate when receiving the integrated circuit.

9. The modular payment card of claim 1, wherein:
each of the first plurality of fasteners is located near a corner of the rectangular front plate, and
each of the second plurality of fasteners is located near a corner of the rectangular rear plate.

10. The modular payment card of claim 1, comprising:
the magnetic strip,
wherein the first plurality of fasteners and the second plurality of fasteners engage magnetically, and
the second plurality of fasteners is offset from the magnetic strip in a direction parallel to a plane of the rectangular rear plate.

11. The modular payment card of claim 1, wherein the rectangular front plate includes a first graphic image on a face opposite the rectangular rear plate.

12. The modular payment card of claim 11, wherein the first graphic image is customizable in response to user input.

13. The modular payment card of claim 1, wherein the rectangular front plate includes a second graphic image on a second face opposing the graphic image.

14. The modular payment card of claim 1, wherein the first plurality of fasteners and the second plurality of fasteners are formed of a non-deformable material.

15. The modular payment card of claim 1, wherein:
the second plurality of fasteners extends outward from the rectangular rear plate toward the rectangular front plate, and
the first plurality of fasteners are set into the rectangular front plate and are configured to receive the second plurality of fasteners.

16. A method of replacing a component of a modular payment card comprising the steps of:

separating a rectangular rear plate from a rectangular front plate overlying the rectangular rear plate such that a first plurality of fasteners fixed to the rectangular front plate disengage from a second plurality of fasteners fixed to the rectangular rear plate, wherein the first plurality of fasteners and the second plurality of fasteners engage magnetically;
removing at least one of an integrated circuit or a magnetic strip from the rectangular rear plate; and
reattaching the rectangular rear plate to the rectangular front plate.

17. The method of replacing a component of a modular payment card of claim 16, further comprising:
insert at least one of a replacement integrated circuit or a replacement magnetic strip prior to reattaching the rectangular rear plate to the rectangular front plate.

18. The method of replacing a component of a modular payment card of claim 16, further comprising:
removing the integrated circuit; and
reattaching the rectangular rear plate to the rectangular front plate such that the payment card is separated from the integrated circuit.

19. The method of replacing a component of a modular payment card of claim 16, further comprising:
removing the magnetic strip; and
reattaching the rectangular rear plate to the rectangular front plate such that the payment card is separated from the magnetic strip.

20. A modular payment card comprising:
a rectangular plate;
a first slot formed in the rectangular plate configured to receive an integrated circuit;
a second slot formed in the rectangular plate configured to receive a magnetic strip, and
a plurality of fasteners fixed to the rectangular plate and configured to removably attach the rectangular plate to an object, wherein the plurality of fasteners engage magnetically.

* * * * *